May 20, 1947.  A. E. LARSEN  2,420,784
HELICOPTER WITH ANTI-TORQUE PROPELLER
Filed May 16, 1945  4 Sheets-Sheet 3
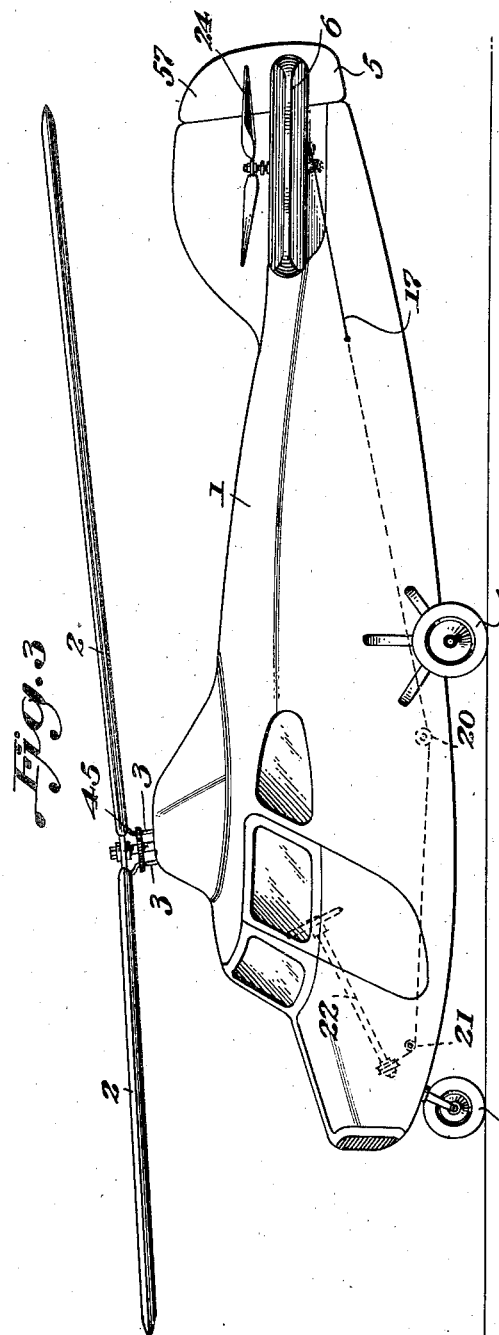
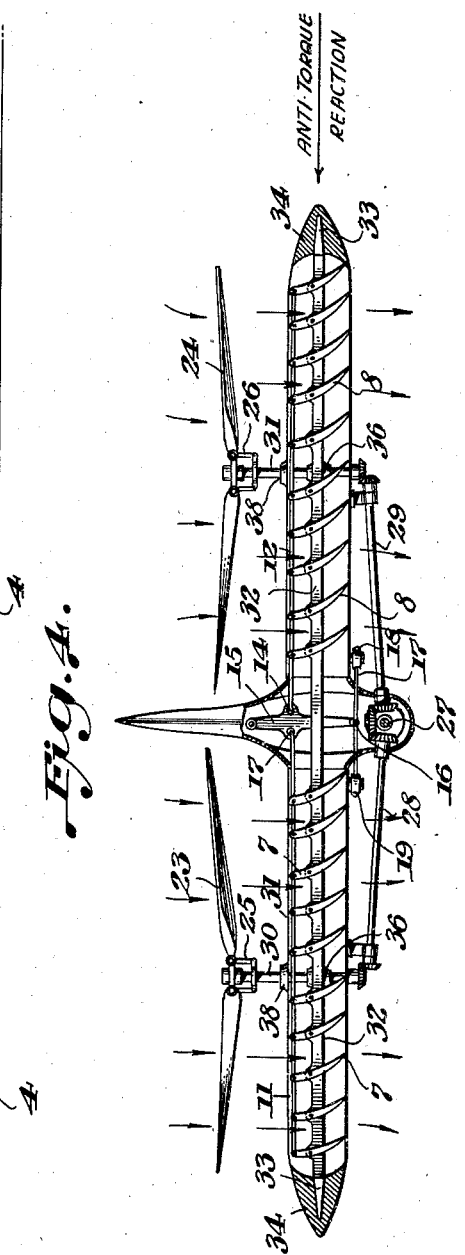
Inventor
Agnew E. Larsen,
By Mason Hatfield
Attorney May 20, 1947. A. E. LARSEN 2,420,784
HELICOPTER WITH ANTI-TORQUE PROPELLER
Filed May 16, 1945 4 Sheets-Sheet 4
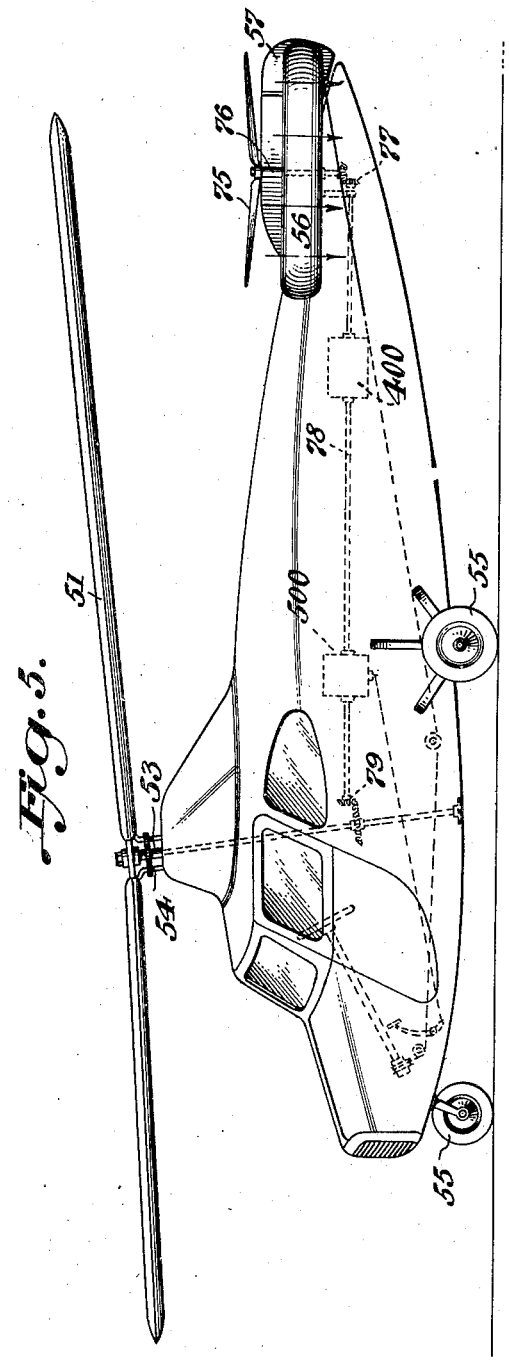
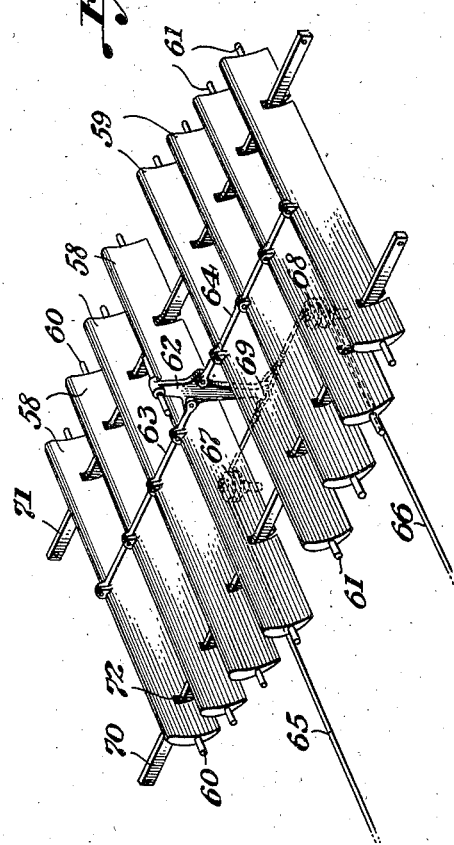
Inventor
Agnew E. Larsen,
By Mason & Hatfield
Attorneys Patented May 20, 1947

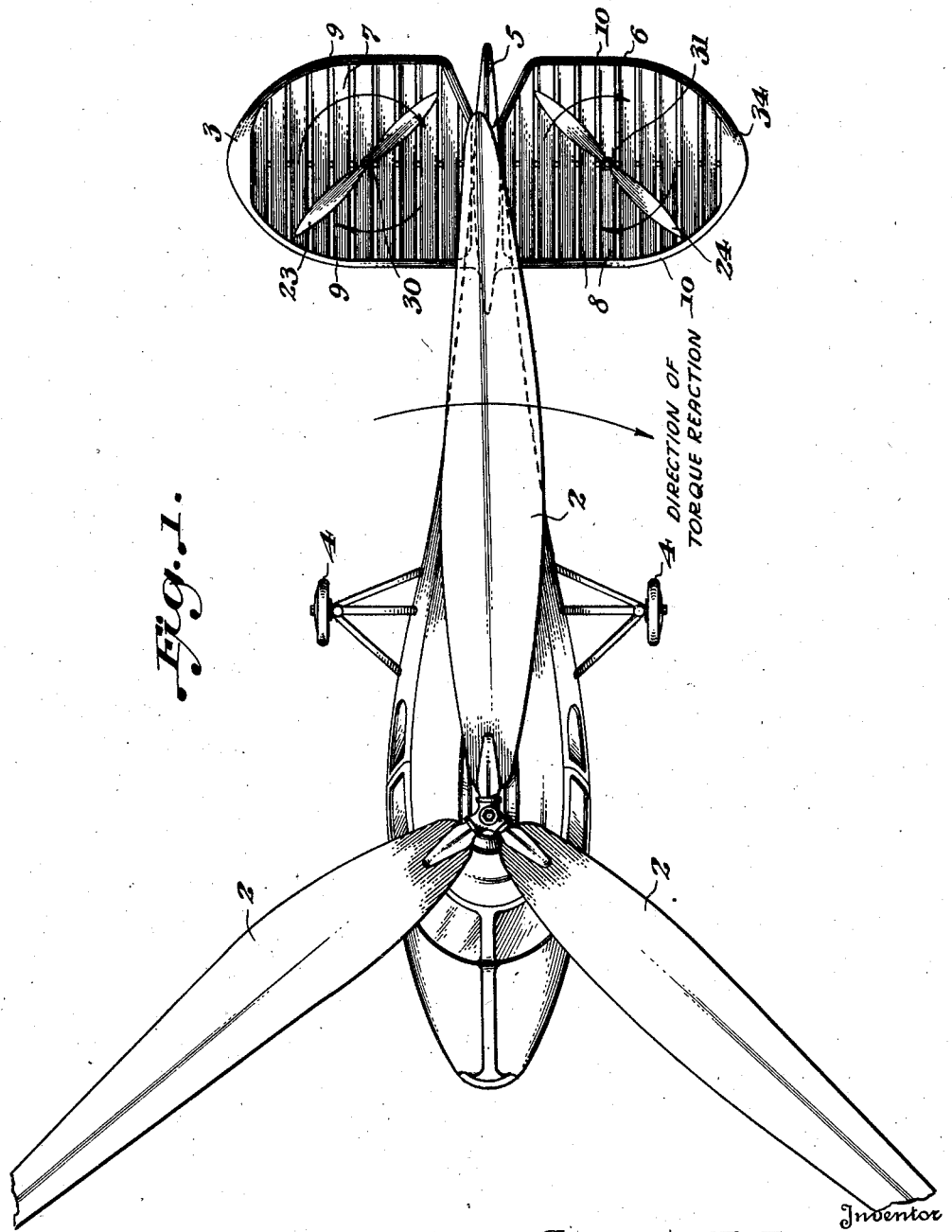

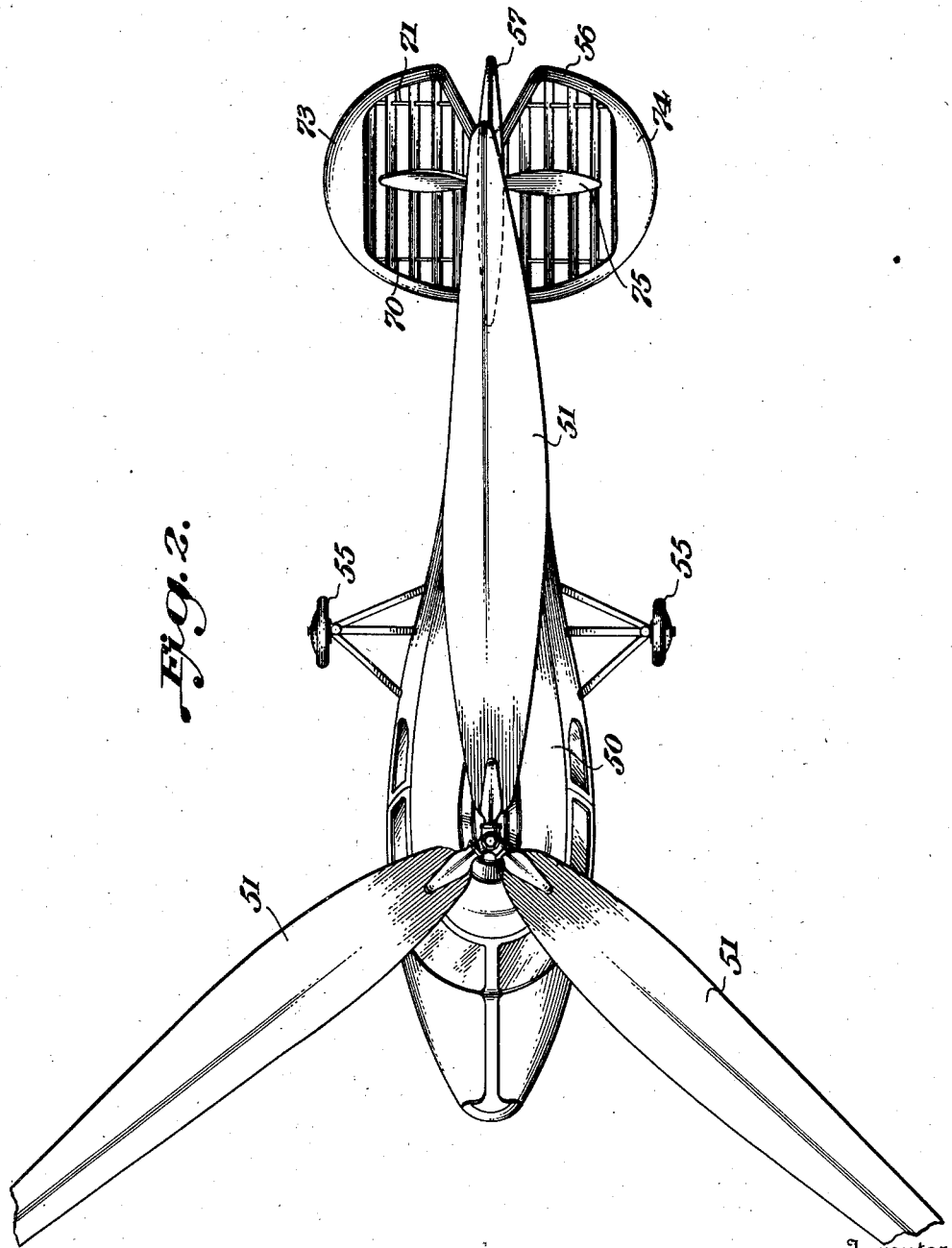

2,420,784

UNITED STATES PATENT OFFICE 2,420,784

HELICOPTER WITH ANTITORQUE PROPELLERS

Agnew E. Larsen, Jenkinstown, Pa., assignor, by mesne assignments, to The Glenn L. Martin Company, Baltimore, Md., a corporation of Maryland Application May 16, 1945, Serial No. 594,098

21 Claims. (Cl. 244—17)

The principal features of this invention are concerned with the maintenance of longitudinal stability of a helicopter or other rotary wing aircraft.

A feature of secondary importance is the provision of anti-torque mechanism which is combined with the means for maintaining longitudinal stability of the aircraft.

An object of the invention therefore is to provide a mechanism for opposing adverse aero-dynamic forces set up by the rotation of the blades of the rotary wing of such aircraft, and to cause these forces to be directed in such manner as to add to the longitudinal stability of the craft.

Another object of the invention is to combine one or more tail propellers with a means for maintaining longitudinal stability in the aircraft.

An object of the invention is to provide a variable pitch control for one or more anti-torque propellers.

A further object of the invention is to provide a variable incidence control for rotary wing aircraft.

A further object of the invention is the combination of an anti-torque propeller with or without pitch control for the blades of said propeller, in combination with variable incidence control means in order to provide a range of reactions which will reduce or substantially eliminate the necessity of differential feathering means of the main rotor blades of the rotary wing.

Other objects will appear hereinafter throughout the specification.

In the drawings:

Figure 1 is a plan view of one application of the invention.

Figure 2 is a plan view of another application of the invention.

Figure 3 is a side elevational view of the structure shown in Figure 1.

Figure 4 is a front elevation, partly in section, of the control mechanism shown in Figures 1 and 3.

Figure 5 is a side elevational view of the structure shown in Figure 2.

Figure 6 is a perspective view of the vanes shown in Figure 2.

The present invention eliminates the use of an anti-torque propeller which rotates in a vertical plane. The use of an anti-torque propeller rotating in a vertical plane raises the problem that the path of the blades must be so located that they will not interfere with the path of rotation of the blades of the main rotor whose path of rotation extends for a considerable distance in front of and toward the rear of the fuselage. In order to avoid such interference it has been necessary heretofore to use an anti-torque propeller having comparatively short blades so as to restrict the radius of rotation of said blades and thereby avoid interference with the blades of the rotary wing. The present invention eliminates any possibility of interference between the rotary wing blades and the blades of the anti-torque propeller. This has been accomplished by mounting the blades of the anti-torque propeller or propellers in such manner that they rotate in a substantially horizontal plane, or in a plane parallel to the plane of rotation of the rotary wing blades. It is therefore possible to use rotary wing blades and/or anti-torque blades of such length as may be necessary according to requirements. It is therefore possible also to shorten the length of the fuselage inasmuch as the anti-torque propeller may be, in the new arrangement, located beneath the blades of the rotary wing.

The present invention includes the use, with or without the anti-torque propeller described above, but preferably in combination therewith, of a plurality of vanes. Both the anti-torque propeller and said vanes may be disposed beneath the blades of the rotary wing, the fuselage length may be shortened, and the main rotor can be of adequate diameter for light disc loading necessary for slower rates of vertical descent.

It is a fundamental rule that longitudinal stability can be attained by means of a positive pitching moment, such moment being held in equilibrium by a longitudinal dampening tail moment. The presently described invention fully establishes this equilibrium because when the anti-torque structure presently to be described is used, the center of gravity of the rotary wing aircraft may be placed relatively forward. Moreover such structure makes it possible to arrange the rotor axis of the rotary wing, to be located at a forwardly inclined angle whereby when the fuselage is disposed substantially horizontally the angle of the main drive shaft of the rotary wing is inclined forwardly thus facilitating forward flight of the aircraft. This will increase the angle attack of the rotary wing. The sum total of upward lift of the anti-torque propeller or propellers, their downward thrust and their co-action on the anti-torque vanes provides stabilizing factors similar to the longitudinal dihedral arrangement of a relatively fixed wing and fixed tail, with movable elevators as provided in conventional fixed wing airplanes.

In the present invention means is provided at the pilot's disposal to accomplish longitudinal balance and trim by the pitch variation means of the tail propellers, or by regulating the anti-torque vane mechanism, or a combination of both, resulting in an infinitely variable arrangement for accomplishing longitudinal balance and trim.

The invention further provides mechanism whereby the means for correcting the torque may be fixed, and set to be in equilibrium for given flight speeds. The invention further includes the use of a conventional airplane rudder which may be actuated to take the place of the operation of pitch-setting of the anti-torque vanes during the forward flight. During forward flight the use of the conventional airplane rudder results in having a less sensitive means of control without varying the pitch moments simultaneously with yawing or torque correcting moments which might correct if the anti-torque vanes are used for directional controls during forward flight.

It is an important result of the present invention to provide both simultaneous and differential pitch control for the main lifting rotor or rotary wing, to affect variation in quantity of lift, or to affect the direction of lift vector both longitudinally or laterally. It further is within the scope of the present invention to eliminate the differential pitch control of the main rotor or rotary wing and to affect such control, i. e. the pitching and rolling control by means of one or more rotary propellers whose plane of rotation is substantially in a horizontal plane; or by the vane means hereinafter described. This control may be affected by adjusting the pitch of the rotary propellers or by adjusting the vanes. It is proposed to use separate controls for the vanes on either side of the longitudinal axis of the aircraft, and where two anti-torque propellers are used, to provide separate controls for pitching the blades of each propeller. The introduction of a differential on either side of the longitudinal axis either by changing the pitch angle of the blades or either of the anti-torque propellers, or separately adjusting the set of vanes on either side of the longitudinal axis of the ship—will produce rolling moments in the aircraft.

Referring to Figures 1, 3 and 4 of the drawings, 1 indicates the fuselage of the aircraft, 2 a rotary wing thereof driven by the inclined drive shaft 45. Suitable means, not shown, but located within the cabin, is connected to the operating means 3 for cyclically changing the pitch of the blades, or for changing the mean pitch of the blades, although it is to be understood that under certain circumstances the means for cyclically changing the pitch may be dispensed with when practicing this invention. The aircraft is provided with the usual tricycle type of ground engaging wheels 4. Suitably mounted at the rear of the fuselage is a rudder 5 similar to the rudder used in "fixed wing" type of airplanes. This may be controlled from the cabin by the conventional control means. Attached to the rear end of the fuselage in such manner as to permit adjustment of the rudder 5, and extending on both sides thereof is an open supporting framework 6, as indicated in Figure 1. This framework extends in a substantially horizontal direction and forms a support for a plurality of vanes 7 and 8. These vanes form horizontal stabilizing surfaces. The ends of vane 7 are pivotally mounted at 9, and the ends of vane 8 are pivotally mounted at 10 to the framework. There is an operating rod 11 pivotally attached to the upper portions of the vanes 7 and a rod 12 pivotally attached to the upper ends of the vanes 8. The adjacent ends of the rods are pivotally attached at 13 and 14 to the lever 15, the lower end of which is connected at 16 to the operating cable 17 which cable is trained over pulleys 18 and 19, through pulleys 20 and 21 to an operator member 22.

A pair of anti-torque propellers is indicated at 23 and 24. The propeller 23 is provided with means 25 and propeller 24 is provided with means 26 for changing the pitch of the blades. Suitable controls, diagrammatically shown at 26', are connected to each of these pitch changing means whereby the pitch of the anti-torque propellers may be individually controlled.

As shown in Figure 4 the driveshaft 27 drives the pair of shafts 28 and 29 in opposite directions. The pitch angle of either anti-torque propeller may be changed to vary the pitch by the provision of a swash plate and suitable mechanism therefor such as shown in Pecker et al. application Serial No. 495,196, filed July 17, 1943, wherein such mechanism is disclosed for controlling the pitch of the rotary wing. The shafts 28 and 29 drive through suitable gearing shafts 30 and 31, respectively, which mount the blades of the anti-torque propellers 23 and 24. The shafts 30 and 31 are mounted in a transverse support 32 having bearings 36, the ends of the transverse support 33 are located in the thickened portions 34 of the frame 6.

Additional bearings 38 for shafts 30 and 31 are shown in Figure 4.

The drift shaft 27 for the propellers 23 and 24 is driven from a power off-take (not shown). This shaft may be connected so as to be driven by the engine which drives the rotary wing or it may be driven by an electric or other conventional driving means shown in diagram in Figure 5.

Figures 2, 5 and 6 show the construction to be used with only one anti-torque propeller. As shown 50 is the fuselage, 51 the rotary wing, 53 the inclined drive shaft therefor, 54 the means for changing the pitch of the rotor wing, and 55 indicates the ground engaging wheels. As indicated by 56 the open supporting framework extends on both sides of the fuselage and is so shaped as to permit turning movements of the rudder 57. As shown in Figure 6 one set of vanes is indicated at 58 and the other set at 59. The set 58 is pivotally supported at 60 in the framework and the set 59 is pivotally supported at 61 in said framework. Means for simultaneously operating these vanes consists of a lever 62 having pivotally attached thereto the rods 63 and 64, which rods are respectively pivoted to the sets of vanes 58 and 59. Means for operating the lever and for tilting the vanes consists of a pair of cables 65 and 66 which are trained over pulleys 67 and 68 respectively and are connected to the end 69 of the lever 62. The length of the individual vanes varies due to the shape of the framework 56, as indicated in Figures 2 and 6.

The pivots 60 and 61 of the vanes pass through the bars 70 and 71 which latter extend through slots 72 of the vanes. The ends of these bars are anchored in the thickened portions 73 and 74 of the framework 56. The single propeller shown at 75 is mounted above framework 56 and vanes 58 and 59 as shown in Figure 5. The propeller is mounted on a suitable driven shaft 76, the shaft being driven through gearing 77 by drive shaft 78 which latter may be drivingly connected, as diagrammatically illustrated at 79 to the inclined shaft 53 for driving the rotary wing. The prime mover for the shafts 53 and 78 is not shown.

Each set of anti-torque vanes located on opposite sides of the central longitudinal axis of the aircraft may be capable of independent adjustment although the sets of vanes are shown as being simultaneously adjusted by a single adjusting means.

The downward thrust of the propellers of Figure 1 or propeller of Figure 2 cause the air driven downwardly to be acted upon by the sets of vanes.

One of the features of the invention is to provide freely rotating auto-giro types of tail propellers as shown in Figure 1, or a propeller as shown in Figure 2. Therefore the clutch 500 shown in Figure 5 may be used with the construction shown in Figures 1 and 3. Referring again to Figure 1, the two propellers 23 and 24, when freely rotating, act as autogiros and the main rotary wing may also be used at this time to thus distribute the weight or lift reaction, which weight or lift reaction is divided between the main rotary wing and the tail auto-giro propellers. In such a case the auto-giro tail propellers will not autogirate unless a definite lift reaction from a supported weight induces the force of auto-rotation which keeps them revolving. Under circumstances where these propellers are used as autogiro anti-torque propellers no variable pitch control for them is required, all of the control being vested in the pitch manipulation of the anti-torque vanes 7 and 8. Such an arrangement is fully adequate because the change of pitch of the vanes 7 and 8 is accompanied with considerable variation in their lift-drag ratio and the anti-torque correction can be accompanied by more or less down reaction as desired, for the longitudinal pitching control of the aircraft as a whole, or through a differential control of the vanes and lateral rolling control of the aircraft as a whole.

In all other existing designs wherein the anti-torque correction is derived from the variable pitch propeller in the variable plane, there is a complete absence of any damping areas in the longitudinal plane. Thus any tendency toward pitching or bucking of the fuselage as a whole must be damped by the rotor itself, i. e., the rotary wing of the aircraft. This imposes added responsibility on the blade pitching mechanisms including the hinge joints thereof, which joints probably cause vibration in the rotor wing. As contrasted with this construction, the presence in the tail structure of the pivoted vanes and rotary anti-torque propellers imparts to the aircraft all of the benefits which are inherent in the so-called stationary wing airplane, which benefits are derived from the damping effect of its tail areas.

By the present placement of propellers a division of lift results between the propeller comprising the rotary wing and the propeller or propellers comprising the anti-torque device. By a proper co-ordination of the upward lift of the one or more tail propellers and the downward (down wash) reaction or thrust on the anti-torque vanes, considerable assistance can be given to the other controls of the ship in order to trim the fuselage as a whole, and to a considerable degree control the longitudinal stability, this latter being for the same general reason as obtains in the case of controls for the usual stationary wing type of airplane.

The disposition and location of the rotary wing, rotary anti-torque means and vane anti-torque means results in a division of the total lift between the rotary wing and the rotary anti-torque means. By longitudinal stability is meant the degree of fixedness about an axis which causes a ship to pitch violently when longitudinally unstable or pitch and recover itself when longitudinally stable, i. e. fore and aftwise.

Without the longitudinal moment or reaction provided in the tail section of the aircraft shown herein the stability of the same is analogous to a tailless airplane or flying wing with the exception that in the case of the usual rotary wing aircraft a satisfactory degree of longitudinal stability is lacking to a great degree. Unless the over-all form of longitudinal stability is provided as herein shown, and which involved rotary wing, the fuselage, and/or tail rotors and vanes, it becomes essential that the stability of the rotary wing and the stability of the fuselage, insofar as the pitching moments is concerned; must be identical, or nearly so, in order that these two remotely related aero-dynamic units may not depart too far from one another throughout the flight speed range. In other words the rate of pitching fore and aft on the rotary wing and the same kind of pitching on the fuselage should be at approximately the same rate. In the present construction (wherein are employed, in connection with a rotary wing aircraft, one or more rotary tail propellers rotating in substantially the same plane as the rotary wing, and anti-torque vanes), results in bringing into proper relationship pitching moments of the fuselage. These movements are stabilized with the pitching moments of the rotary wing. It is important that the surface area of the rotary wing, the fuselage, the anti-torque propellers and anti-torque vanes be designed to approximate normal tail area coefficients for good airplane descent practice. Airplanes become longitudinally stable when the restoring forces of the tail surface are made greater than the disturbing forces on the wings whereby said restoring forces over-power the disturbing forces and thus bring them under control.

It will therefore be understood that the considerations of longitudinal stability are a primary factor in the present invention and that the anti-torque capacities of the invention are merely a by-product of the means for maintaining longitudinal stability and this is true because of the lift and drag characteristics of the anti-torque vanes which utilize the well-known high L/D relationship which imparts a 15 to 1 component of lift for every unit down-drag (from rotary wing downward).

Another advantage of the present construction arises because of the arrangement of the drives of the one or more anti-torque propellers as indicated beneath the plane of rotation of the rotary wing. The individual driving torque of the anti-torque propellers, if smaller than that of the torque of the rotary wing, has a long moment arm, and this moment arm can be made to be active or counteractive to that of the torque of the rotary wing, thus reducing the amount required of the anti-torque vanes.

Moreover, and as a most important aspect of this invention the anti-torque propellers of Figure 1, or the propeller of Figure 2, may be de-clutched or cut free from their drive shafts as shown by clutch 400, Figure 5, and they thus become freely rotative as auto-giros and are controllable as direct control auto-giro rotors, while still functioning through their down-wash on the anti-torque vanes and without any expenditure of mechanical power.

I claim:

1. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, said drive means including a releasable clutch, a plurality of vanes, means mounting said vanes adjacent to said auxiliary wing means, on pivotal axes extending parallel to the longitudinal axis of the aircraft, said vanes being positioned to react with said auxiliary wing means slip stream, and means for adjusting said vanes, said auxiliary wing means being constructed and arranged in such manner whereby upon the declutching of said clutch said rotary wing means will function auto-rotatably.

2. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, said drive means including a releasable clutch, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, and means for adjusting said vanes, said auxiliary wing means being constructed and arranged in such manner whereby upon the declutching of said clutch said rotary wing means will function auto-rotatably, said auxiliary wing means comprising a pair of propellers.

3. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means having a plurality of blades, and means for controlling the pitch of said blades.

4. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, and means for adjusting said vanes, the axis of rotation of said main rotary wing being inclined forwardly with respect to the rotation of said auxiliary wing means.

5. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending substantially parallel to the longitudinal axis of the aircraft, said vanes being positioned to react with said auxiliary wing means slip stream, and means for adjusting said vanes, said vanes being mounted on said fuselage beneath said auxiliary wing means.

6. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means having a plurality of blades, and means for controlling the pitch of the blades, said vanes being mounted on said fuselage beneath said auxiliary wing means.

7. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, and means for adjusting said vanes, said auxiliary wing means being located beneath the plane of rotation of said main rotary wing, said vanes being mounted on said fuselage beneath said auxiliary wing means.

8. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, and means for adjusting said vanes, the axis of rotation of said main rotary wing being inclined forwardly with respect to the rotation of said auxiliary wing means, said vanes being mounted on said fuselage beneath said auxiliary wing means.

9. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending substantially parallel to the longitudinal axis of the aircraft, said vanes being positioned to react with said auxiliary wing means slip stream, means for adjusting said vanes, and a substantially horizontal framework extending on opposite sides of said fuselage and surrounding said vanes.

10. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means having a plurality of blades, means for controlling the pitch of said blades, and a substantially horizontal framework extending on opposite sides of said fuselage and surrounding said vanes.

11. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means being located beneath the plane of rotation of said main rotary wing, and a substantially horizontal framework extending on opposite sides of said fuselage and surrounding said vanes.

12. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, driven means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, the axis of rotation of said main rotary wing being inclined forwardly with respect to the rotation of said auxiliary wing means, and a substantially horizontal framework extending on opposite sides of said fuselage and surrounding said vanes.

13. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending substantially parallel to the longitudinal axis of the aircraft, said vanes being positioned to react with said auxiliary wing means slip stream, and means for adjusting said vanes, said auxiliary wing means comprising a pair of propellers, said propellers being mounted on opposite sides of said fuselage.

14. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means having a plurality of blades, and means for controlling the pitch of said blades, said auxiliary wing means comprising a pair of propellers, said propellers being mounted on opposite sides of said fuselage.

15. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, and means for adjusting said vanes, said auxiliary wing means being located beneath the plane of rotation of said main rotary wing, said auxiliary wing means comprising a pair of propellers, said propellers being mounted on opposite sides of said fuselage.

16. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, and means for adjusting said vanes, the axis of rotation of said main rotary wing being inclined forwardly with respect to the rotation of said auxiliary wing means, said auxiliary wing means comprising a pair of propellers, said propellers being mounted on opposite sides of said fuselage.

17. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, and a substantially horizontal framework extending on opposite sides of said fuselage and surrounding said vanes, said auxiliary wing means comprising a pair of propellers, said propellers being mounted on opposite sides of said fuselage.

18. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means having a plurality of blades, means for controlling the pitch of said blades, and a substantially horizontal framework extending on opposite sides of said fuselage and surrounding said vanes, said auxiliary wing means comprising a pair of propellers, said propellers being mounted on opposite sides of said fuselage.

19. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, said auxiliary wing means being located beneath the plane of rotation of said main rotary wing, and a substantially horizontal framework extending on opposite sides of said fuselage and surrounding said vanes, said auxiliary wing means comprising a pair of propellers, said propellers being mounted on opposite sides of said fuselage.

20. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, the axis of rotation of said main rotary wing being inclined forwardly with respect to the rotation of said auxiliary wing means, and a substantially horizontal framework extending on opposite sides of said fuselage and surrounding said vanes, said auxiliary wing means comprising a pair of propellers, said propellers being mounted on opposite sides of said fuselage.

21. In a rotary wing aircraft including a fuselage, a main rotary wing mounted above said fuselage, means for driving said main wing, an auxiliary rotary wing means, means mounting said auxiliary wing means adjacent the rear end of said fuselage, said auxiliary rotary wing means having a substantially horizontal plane of rotation during normal flight movements of said aircraft, drive means for said auxiliary wing means, a plurality of vanes, means mounting said vanes adjacent to said auxiliary wing means, on pivotal axes extending in a fore and aft direction extending parallel to the longitudinal axis of the aircraft, said vanes being positioned to react with said auxiliary wing means slip stream, means for adjusting said vanes, manual means for causing said vanes to pivot including a pivoted lever and rods attached to said lever extending on opposite sides therefrom, a framework surrounding said vanes, said auxiliary rotary wing means having a substantially vertical driveshaft means, and means for mounting said driveshaft means on said framework.

AGNEW E. LARSEN.

REFERENCES CITED

The following references are of record in the file of this patent:

UNITED STATES PATENTS

| Number | Name | Date |
|---|---|---|
| 1,842,250 | Bobrovsky | Jan. 19, 1932 |
| 2,008,424 | Stalker | July 16, 1935 |
| 1,344,486 | Coffelt | June 22, 1920 |
| 2,369,652 | Avery | Feb. 20, 1945 |
| 1,701,762 | Pitcairn | Feb. 12, 1929 |
| 1,887,703 | Vaughn | Nov. 15, 1932 |
| 1,046,895 | Stubblefield | Dec. 10, 1912 |

FOREIGN PATENTS

| Number | Country | Date |
|---|---|---|
| 317,059 | Great Britain | Feb. 9, 1931 |